United States Patent [19]

Luukkonen

[11] Patent Number: 5,167,331

[45] Date of Patent: Dec. 1, 1992

[54] SET OF SHELVES

[76] Inventor: Irja Luukkonen, Hedelmätarhantie 13 A 25, SF-15860 Hollola, Finland

[21] Appl. No.: 699,996

[22] Filed: May 13, 1991

[30] Foreign Application Priority Data

Aug. 20, 1990 [FI] Finland .................................. 904131

[51] Int. Cl.$^5$ .................................................. A47F 5/00
[52] U.S. Cl. .................................... 211/186; 211/187; 211/181; 108/111
[58] Field of Search ............... 211/187, 186, 182, 181, 211/90; 108/111, 144

[56] References Cited

U.S. PATENT DOCUMENTS

| | | | |
|---|---|---|---|
| 2,919,817 | 1/1960 | Maslow | 211/182 X |
| 3,316,864 | 5/1967 | Maslow | 211/181 X |
| 3,589,746 | 6/1971 | Inglis | 211/187 X |
| 4,493,425 | 1/1985 | Yoshida | 211/182 X |
| 4,515,280 | 5/1985 | Sheu | 211/186 X |
| 4,708,310 | 11/1987 | Smith | 211/90 X |
| 4,735,325 | 4/1988 | Remmers | 211/90 X |
| 5,027,959 | 7/1991 | Luukkonen | 211/187 X |

FOREIGN PATENT DOCUMENTS 3506542  9/1986  Fed. Rep. of Germany ...... 211/181

Primary Examiner—Robert W. Gibson, Jr.
Attorney, Agent, or Firm—Merchant, Gould, Smith, Edell, Welter & Schmidt

[57] ABSTRACT

A set of shelves or equivalent, comprising at least two vertical elements ($1^1, 1^2$) having substantially rectangular shape and each comprising vertical edge posts (2) and therebetween horizontal carrier bars (3) which connect the edge posts rigidly with each other; at least one horizontal element (4) which has been arranged to be joined to the vertical elements, and said horizontal element comprising a first side bar ($5^1$) and a second side bar ($5^2$), these being disposed at an angle ($\alpha$), advantageously e.g. a right angle, relative to each other, and the vertical elements being disposed relative to each other at the same angle ($\alpha$), advantageously e.g. at right angles, so that the angle between the carrier bars ($2^1, 2^2$) on the same level of two adjacent vertical elements ($1^1$) and $1^2$) equals the angle ($\alpha$) between the side bars of the horizontal element; and the set of shelves comprises a fixing element (6) for connecting the horizontal element substantially fixedly and detachably to the vertical elements. The fixing element (6) comprises a first engagement member (7) for detachably affixing the fixing element to two carrier bars ($2^1, 2^2$) on the same level of two adjacent vertical elements ($1^1, 1^2$) for fixing the vertical elements at a given angle ($\alpha$), advantageously e.g. at right angles, relative to each other; and a second engagement member (8) which has been arranged to engage with the first and second side bars ($5^1, 5^2$) for detachably affixing the horizontal element (4) to the fixing element.

14 Claims, 4 Drawing Sheets

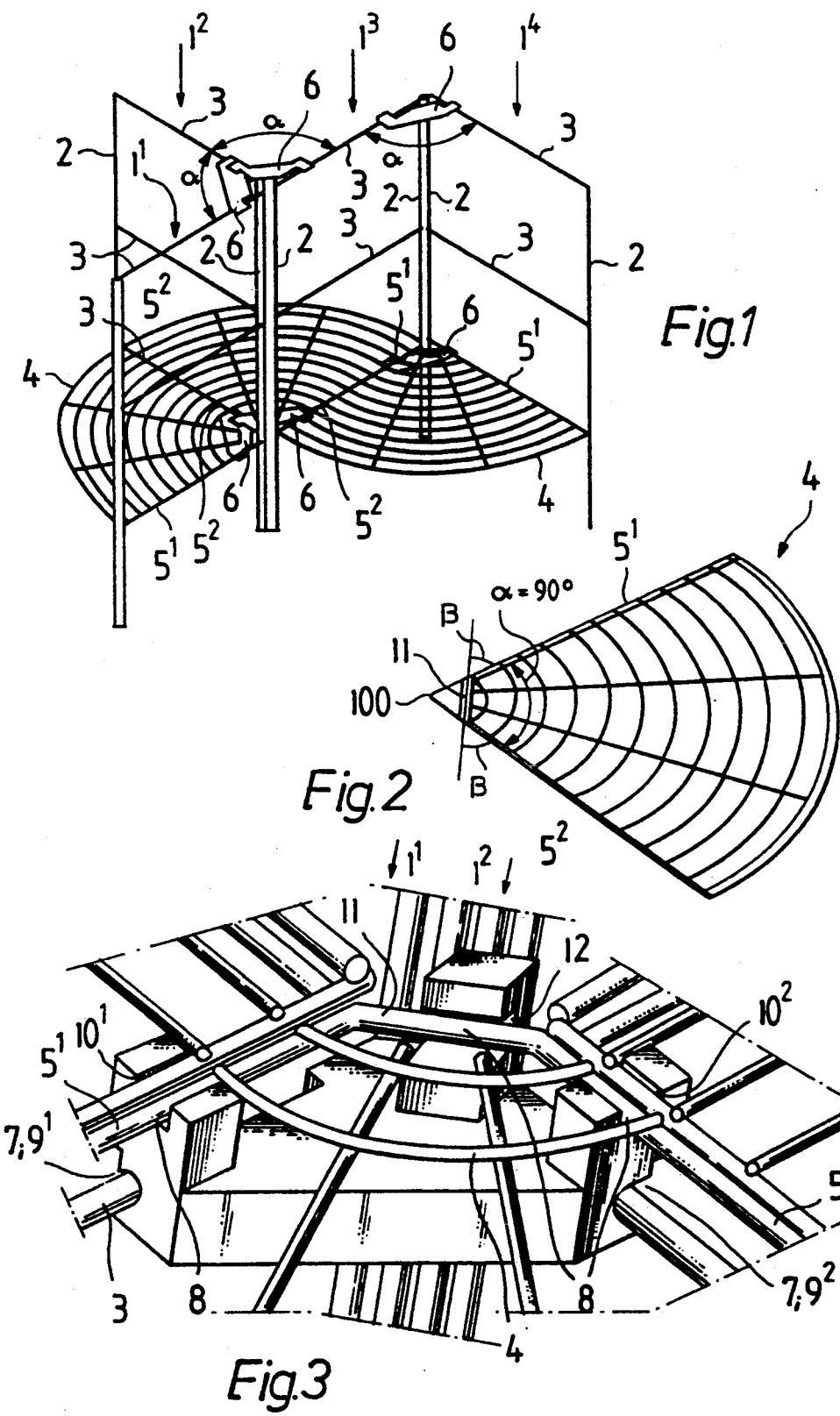

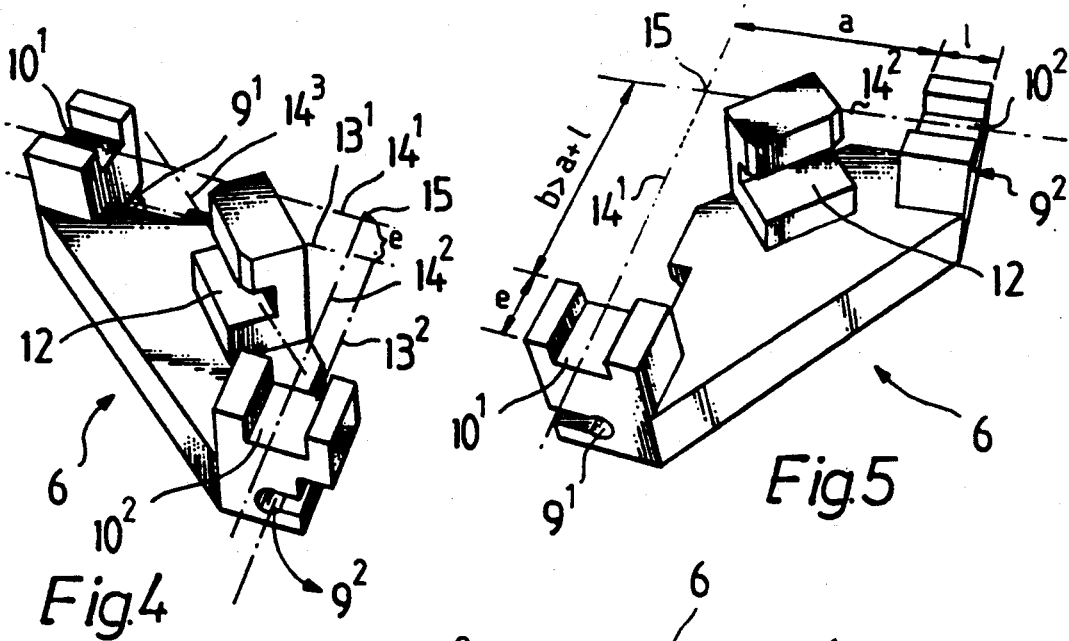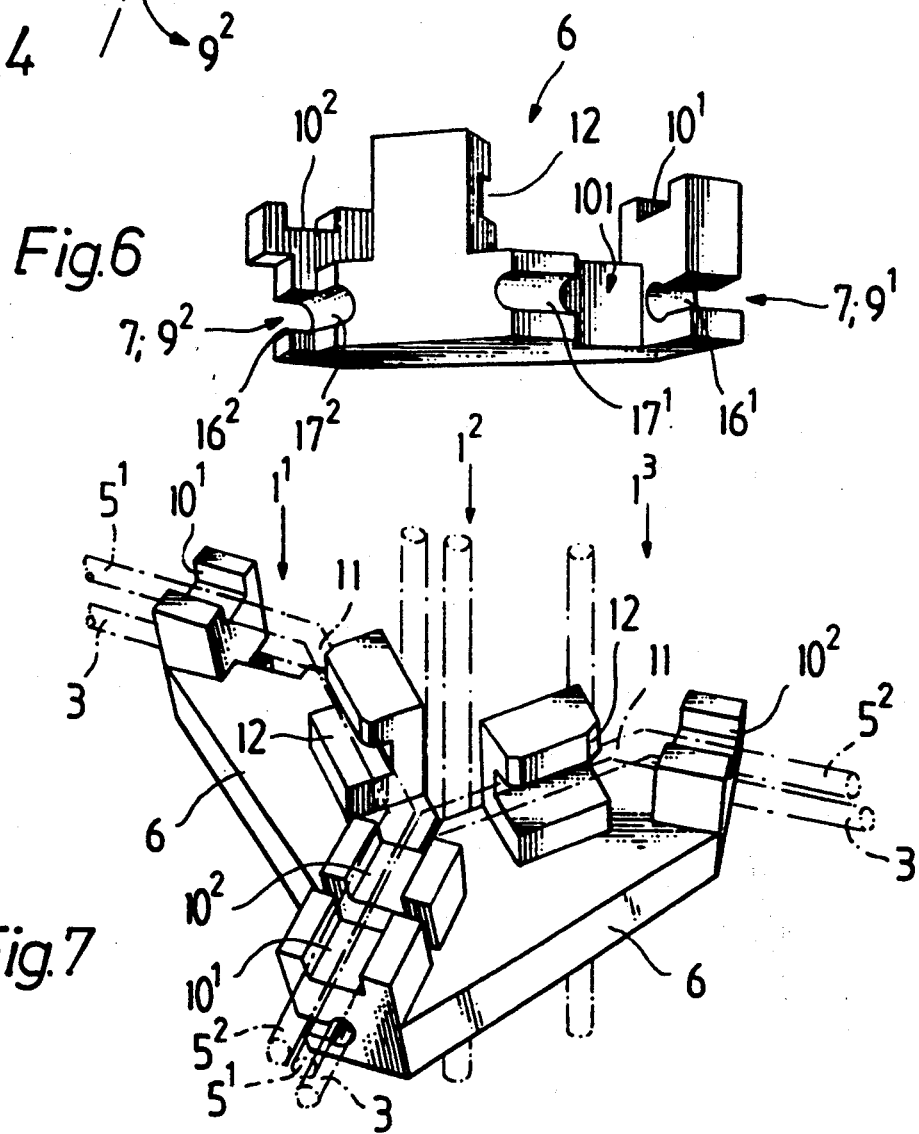

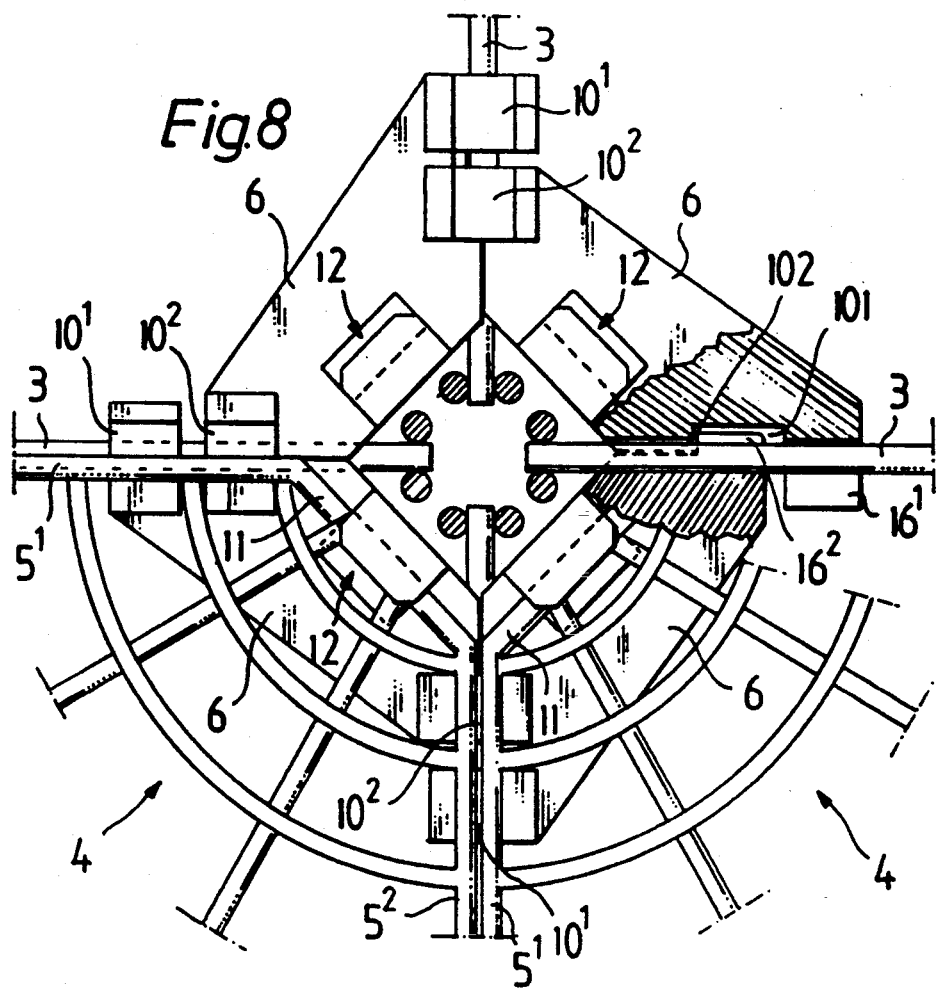
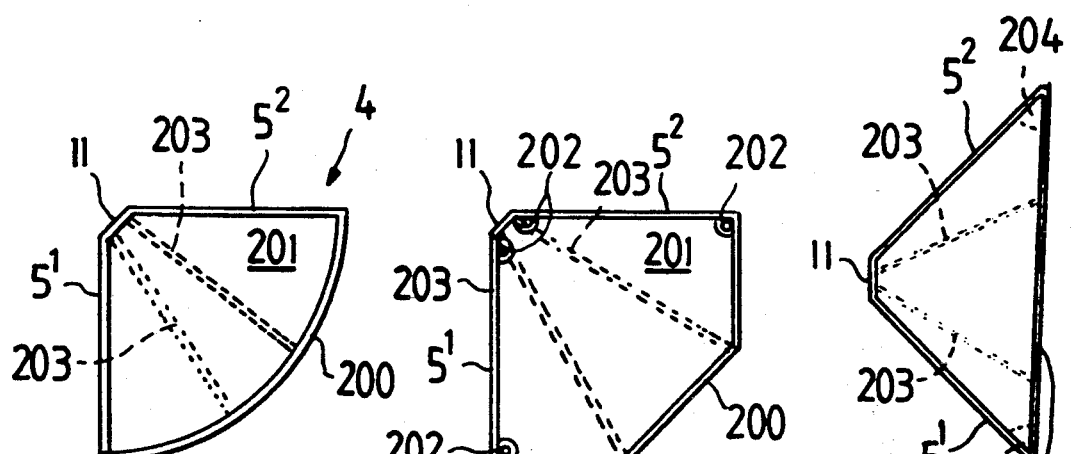

SET OF SHELVES

FIELD OF THE INVENTION

The present invention concerns a set of shelves.

Sets of shelves conforming to the preamble are used as goods shelves e.g. in shops for goods display, and in warehouses.

BACKGROUND OF THE INVENTION

Sets of shelves of the type in question are embarrassed by the problem that their assembly and erection is cumbersome and consumes ample time.

It is furthermore a problem associated with sets of shelves of prior art that use of conventional fixing elements is awkward because special tools are required in conjunction with them. One further problem with sets of shelves of prior art is that, when assembled with existing fixing elements, the shelf sets have heretofore afforded a greatly limited range of variation, and one has been compelled to restrict oneself to few variants as regards the external configuration of the shelf sets.

It is furthermore a problem associated with shelf sets of prior art that owing to the design of the fixing elements the shelf area has remained small.

SUMMARY OF THE INVENTION

The object of the invention is to eliminate these drawbacks.

As taught by the invention, the fixing element comprises a first engagement member for detachably affixing the fixing element to two carrier bars, on the same level, of two adjacent vertical elements for fixing the vertical elements under a given angle, advantageously e.g. at right angles, to each other; and a second engagement member which has been disposed to clamp to a first and second side bar for detachably fixing a horizontal element to the fixing element.

In an embodiment of the set of shelves the first engagement member comprises at least two horizontal carrier jaws, open on the side and outward, their longitudinal axes paralleling the carrier bar, positioned at an angle relative to each other, advantageously e.g. at right angles, and each one disposed to receive a carrier bar for securing same to the fixing element.

In an embodiment of the set of shelves one of the two engagement members comprises at least two upwards open horizontal side bar channels, their longitudinal axes paralleling the side bars, positioned at an angle relative to each other, advantageously e.g. at right angles, and each one disposed to receive a side bar for securing same to the fixing element.

In an embodiment of the set of shelves the horizontal element comprises a cross bar disposed to connect the side bars and rigidly with each other; the cross bar is located between the side bars at a distance from the imagined intersection of the side bars' longitudinal axes, e.g. so that the angles enclosed by the cross bar and both side bars are substantially equal; the second engagement member of the fixing element comprises a cross bar channel with its longitudinal axis paralleling the cross bar; and the cross bar channel has been arranged to be detachably fixed to the cross bar.

In an embodiment of the set of shelves the longitudinal axes of the carrier bar channels lie in a plane which is located at a distance from the parallel plane in which the longitudinal axes of the side bar channels and of the cross bar channel lie.

In an embodiment of the set of shelves the set of shelves comprises a plurality of vertical planes which have been secured to each other with mutually similar fixing elements.

In an embodiment of the set of shelves the fixing element has been formed to be such that the carrier channels of two similar fixing elements placed side by side lie in the same plane; and adjacent carrier jaws belonging to different fixing elements have been arranged to engage with one and the same carrier bar.

In an embodiment of the set of shelves the fixing element has been formed so that the side bar channels of two adjacent, similar fixing elements lie in one plane, the adjacent side bar channels belonging to different fixing elements being arranged to engage with one and the same side bar.

In an embodiment of the set of shelves the fixing element constitutes a body of one integral material, such as plastic, on which the first and second engagement members have been formed.

In an embodiment of the set of shelves the first engagement member and/or the second engagement member has been arranged to constitute a quick coupling, such as a spring interlock coupling, for instance.

In an embodiment of the set of shelves the side bar channels comprise a first side bar channel and a second side bar channel; the length of the first side bar channel is substantially the same as that of the second side bar channel; and the side bar channels have been formed asymmetrically on the fixing element so that the distance of the end of the first side bar channel from the imagined intersection of the longitudinal axes of the first and second side bar channels exceeds the distance of the end of the second side bar channel from said intersection by at least the length of the side bar channel, whereby when fixing elements are placed side by side the first side bar channel will be consecutive with the second side bar channel for their securing to one and the same side bar.

In an embodiment of the set of shelves the carrier bar channels comprise a first carrier bar channel for securing to the carrier bar a first vertical element and a second carrier bar channel for securing to the carrier bar a second vertical element; to the first carrier bar channel belongs a first engagement member for engaging a carrier bar and a first guide member for guiding the fixing element to parallel the carrier bar, and to the second carrier bar channel belongs a second engagement member for engaging a carrier bar and a second guide member for guiding the fixing element to parallel the carrier bar; the first engagement member has a length equal to that of the first side bar channel and is in register therewith, and the second engagement member is in register with the second side bar channel and has the same length as this bar.

In an embodiment of the set of shelves a space has been provided between the first engagement member and the first guide member which is greater than the length of the second engagement member, and the fixing element comprises cooperating members, such as abutment surfaces and shoulders resting against each other, for disposing two fixing elements side by side, the first engagement member of the first fixing element being consecutive with the second engagement member of the second fixing element.

The advantage of the invention is that it enables a very great number of different shelf set variants, which can be created with a small number of different shelf components.

A further advantage of the invention is that the set of shelves is exceedingly rapidly and easily assembled, and the set of shelves is firm and stable, regardless of its configuration.

Furthermore, thanks to the invention, no tools are needed to assemble or disassemble the set of shelves.

Still another advantage of the invention is that owing to it the shelf area can be maximized, shelf planes being placeable side by side without leaving any gap therebetween.

BRIEF DESCRIPTION OF THE DRAWINGS

In the following the invention is described in detail, referring to the drawing attached, wherein:

FIG. 1 presents, in axonometric perspective and seen obliquely from above, an embodiment of the set of shelves of the invention, depicted at the assembly stage, FIG. 2 presents, in axonometric perspective and seen obliquely from above, a horizontal element, or shelf plane sector, of the set of shelves of FIG. 1, FIG. 3 presents, in axonometric perspective and seen obliquely from above, a detail of another embodiment of the set of shelves of the invention, the shelf elements being mounted with the aid of a fixing element, FIGS. 4 and 5 present, in axonometric perspective, the fixing element of FIG. 3, in oblique front view, in two different positions, FIG. 6 presents, in axonometric perspective, the fixing element of FIG. 3, as seen obliquely from below and from the rear, FIG. 7 presents two fixing elements of FIG. 3, placed side by side, FIG. 8 presents in top view, and sectioned, a third embodiment of the set of shelves of the invention in which four vertical elements have been installed with four fixing elements, a horizontal element being mounted, carried by two of them, FIGS. 14–16 present in top view, three different embodiments of a sector-shaped horizontal element.

DETAILED DESCRIPTION OF THE PREFERRED EMBODIMENT

Figure 9:
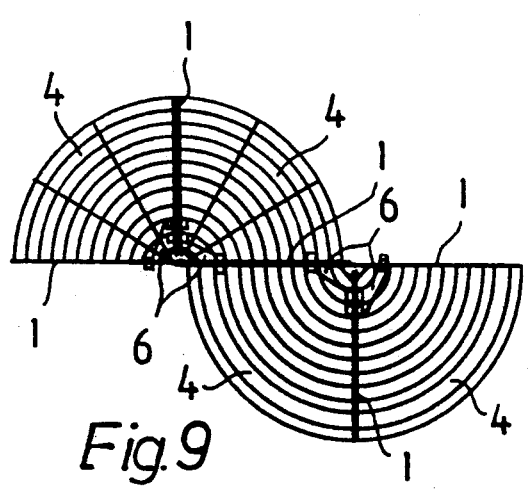
FIGS. 9–13 present schematically and in top view, a fourth, fifth, sixth, seventh and eighth embodiment of the set of shelves of the invention.

In FIG. 1 is depicted a simple set of shelves, of which a retail sales counter in a shop, or equivalent, has been created. The set of shelves comprises four vertical elements $1^1$ $1^2$, $1^3$ and $1^4$. The vertical elements have the shape of rectangles, and each element comprises vertical edge posts 2 and horizontal carrier bars 3 therebetween. The carrier bars 3 bind in each vertical element its edge posts 2 rigidly together. The set of shelves furthermore comprises three horizontal elements 4, or shelf planes, made of metal wire grating to constitute a substantially rigid structure. The horizontal elements 4 have been designed to have such dimensions that they can be joined to the vertical elements. In the interest of lucidity, in the figure only horizontal elements disposed in one plane are shown, but it is obvious that such elements can be installed in several planes, one above the other, on the carrier bars 3 of the vertical elements. Similarly, the shelf plane part of the horizontal element 4 is not necessarily made of metal wire grating. The side bars and cross bar, or equivalent members, may merely constitute the frame of the horizontal element 4 or part thereof, which has been made e.g. of metal bars, while the plane component intended to carry goods may be made of continuous sheet material, e.g. of plastic, glass, metal, etc., which has been fixed in any appropriate way in said frame (see FIGS. 14–16, described farther below).

As can also be seen in FIG. 2, the horizontal element 4 comprises a first side bar $5'$ and a second side bar $5^2$, these being arranged to enclose a right angle $\alpha$ with each other, and the vertical elements $1^1$ and $1^2$ have been disposed to enclose with each other the same angle $\alpha$ so that the angle between carrier bars $3^1$ and $3^2$, on the same level, of two adjacent vertical elements $1^1$ and $1^2$ equals the angle $\alpha$ between the side bars $5^1$ and $5^2$ of the horizontal element 4. The set of shelves comprises fixing elements 6 for joining the horizontal elements 4 in substantially rigid manner, and detachably, with the vertical elements $1^1$, $1^2$, $1^3$ and $1^4$.

FIG. 3 reveals the design of the fixing element 6 more clearly. The fixing element 6 comprises a first engagement member 7, with the aid of which the fixing element can be secured to two carrier bars on the same level, $3^1, 3^2$, of two adjacent vertical elements $1^1, 1^2$ so that the vertical elements $1^1, 1^2$ enclose a given angle $\alpha$, i.e., an angle of 90° in this example, with each other. The fixing element 6 further comprises a second engagement member 8, which is disposed to engage the first side bar $5^1$ and the second side bar $5^2$ for detachable fixing of the horizontal element 4 to the fixing element 6.

It is seen in FIGS. 3–6 that the first engagement member 7 comprises horizontal carrier jaws $9^1, 9^2$, which are open laterally and outward and the longitudinal axes of which parallel the carrier bars $3^1, 3^2$, enclosing the angle $\alpha$, advantageously a right angle, and each arranged to receive a carrier bar for fixing same to the fixing element 6.

The second engagement member 8 comprises two upward open, horizontal side bar channels $10^1, 10^2$, their longitudinal axes paralleling the side bars $5^1, 5^2$ and enclosing with each other the angle $\alpha$, i.e., a right angle. Each side bar channel $10^1, 10^2$ is arranged to receive the respective side bar $5^1, 5^2$, to carry it.

As can be seen in FIGS. 2 and 3, the horizontal element 4 comprises a cross bar 11 which joins the side bars $5^1, 5^2$ rigidly to each other. The cross bar 11 is located between the side bars and at a distance from the imagined intersection 100 of the side bars' longitudinal axes so that the angle $\beta$ between the cross bar and either side bar $5^1$ and $5^2$ is equal. The second engagement member 8 of the fixing element 6 comprises a cross bar 12, the longitudinal axis of this cross bar paralleling the cross bar 11. The cross bar 11 has been arranged to be detachably secured to the cross bar 12.

The fixing element 6 is made of durable plastic e.g. by a die casting process, to be one integral, solid body. The carrier bar channels, side bar channels and cross bar channel, and the rest of the details regarding the shape of the fixing element 6 are therefore produced in the ultimate body in one single work step. Tight fixing of the bars in the respective channels is advantageously accomplished by observing suitable fits, and by making use of the plastic material's resilience, in aid of which small restrictions may be provided in the end regions of the channels to constitute holding members which form a spring interlocking and which yield when a bar is pushed into the channel or pulled out, and which return to their original shape owing to the elasticity of the material.

FIG. 4, among others, reveals that the longitudinal axes $13^1, 13^2$ of the carrier jaws $9^1, 9^2$ lie in a plane which is at a distance e from the parallel plane in which the longitudinal axes $14^1, 14^2, 14^3$ of the side bar channels $10^1, 10^2$ and of the cross bar 12 lie. Thereby the horizontal element 4, mounted on the fixing element 6 mounted on the carrier bars 3, will lie higher than the carrier bars 3, by the distance e.

In FIG. 7 is schematically depicted a detail of a set of shelves comprising three vertical elements $1^1$, $1^2$ and $1^3$. The vertical elements have been secured to each other with mutually identical fixing elements 6.

The fixing element 6 has been formed to be such that the carrier bar channels $9^1, 9^2$ of two similar fixing elements 6 placed side by side are on the same level. The adjacent carrier bar jaws belonging to different fixing elements 6 are arranged to engage with the same carrier bar 3. The fixing element 6 has further been shaped such that the side bar channels $10^1, 10^2$ of two adjacent, similar fixing elements 6 are on the same level. The adjacent side bar channels belonging to different fixing elements have then been arranged to engage with one and the same side bar $5^1, 5^2$.

FIG. 4 reveals that the side bar channels $10^1, 10^2$ comprise the first side bar channel $10^1$ and the second side bar channel $10^2$. The length 1 of the first side bar channel $10^1$ is substantially the same as the length of the second side bar channel $10^2$. The placement of the side bar channels in the fixing element has been made asymmetric so that the distance b of the end of the first side bar channel $10^1$ from the imagined intersection of the first and second side bar channels is less than the distance a of the end of the second side bar channel from said intersection by at least the length 1 of the side bar channel. Thereby when fixing elements 6 are placed side by side as in FIG. 7, the first side bar channel $10^1$ will be consecutive with the second side bar channel $10^2$, for attachment of both to one and the same side bar $5^2$ (or $5^1$). The side bar channels have been dimensioned so that two side bars of an adjacent horizontal element fit into them.

In FIG. 8 is illustrated, still in top view, the intercalation of several fixing elements 6, whereby adjacent horizontal elements 4, placed in the fixing elements 6, will be closely together, forming a continuous plane. To the two fixing elements 6 seen at the bottom two horizontal elements 4 have been affixed. The horizontal element 4 is mounted on the fixing element 6 in that first the cross bar 11 is pushed into the cross bar channel 12 opening towards the horizontal element, holding the horizontal element slightly tilted. The cross bar 11 rests against the bottom of the cross bar channel 12 and against the top wall, thus constituting a pivot point enabling the horizontal element 4 to be lowered so that the side bars $5^1, 5^2$ are taken up and carried by the side bar channels $10^1$ and $10^2$.

FIG. 6 reveals best how the carrier bar channels $9^1, 9^2$ comprise a first carrier bar channel $9^1$ for attachment to the carrier bar 3 of the first vertical element $1^1$ and a second carrier bar channel $9^2$ for attachment to the carrier bar 3 of the second vertical element $1^2$. The first carrier bar channel $9^1$ comprises a first engagement part $16^1$, which is provided for engagement with the carrier bar 3, and a first guide part $17^1$ for furthermore directing the fixing element 6 to be parallel to the carrier bar 3. The second carrier bar channel $9^2$ comprises a second engagement part $16^2$ for engagement with the carrier bar and a second guide part $17^2$ for directing the fixing element 6 to be parallel to the carrier bar. The first engagement part $16^1$ has the same length as the first side bar channel $10^1$ and is in the same location, directly therebeneath, and the second engagement part $16^2$ is similarly in register with the second side bar channel $19^2$ and has the same length as this channel. Between the first engagement part $16^1$ and the first guide part $17^1$ a space 101 has been provided which is larger than the length of the second engagement part $16^2$. As can also be seen in the partial section on the right in FIG. 8, members cooperating with the fixing element are provided, such as shoulders 102 meeting each other, for disposing two fixing elements side by side, with intercalation, the first engagement part $16^1$ on the first of two adjacent fixing elements, being consecutive with the second engagement part $16^2$ on the second fixing element.

FIGS. 9–13 present a few different shelf set variants which are enabled by using the fixing element 6 for component joining the shelf elements. The shelf set designer's imagination is the sole factor imposing limits on those versatile configurations and variations which are achievable with the shelf set construction and fixing element of the invention.

The shelf set construction of FIG. 9 has five vertical elements 1 on which four horizontal elements have been mounted in S configuration in one plane and at 90° angles relative to each other. The horizontal elements 4 have the shape of a circular sector. The set of shelves can be made to wind in any manner that may be desired, by placing fixing elements 6 at different corners of the horizontal element 4.

Figure 10:
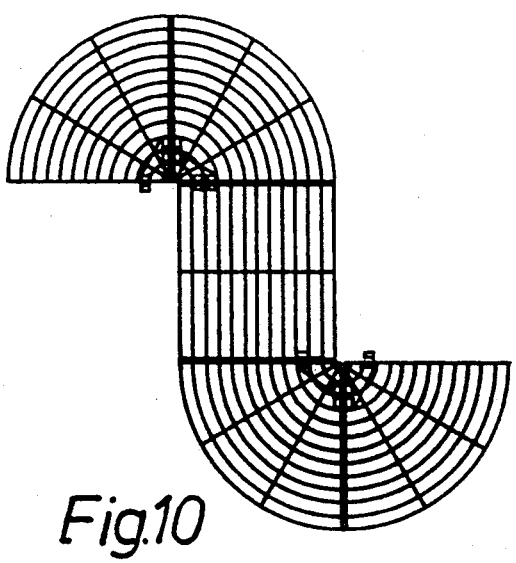

The set of shelves of FIG. 10 is otherwise like that of FIG. 9, except that it also contains a rectangular horizontal element.

Figure 11:
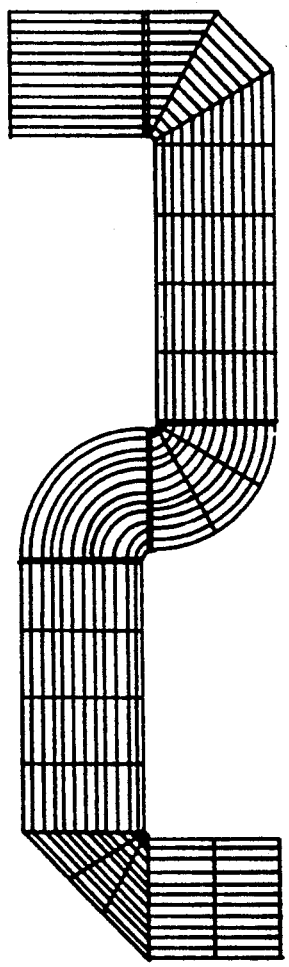

In FIG. 11 is shown a set of shelves comprising both rectangular horizontal elements of different lengths and triangular, circular sector-shaped and polygon sector-shaped horizontal elements.

Figure 12:
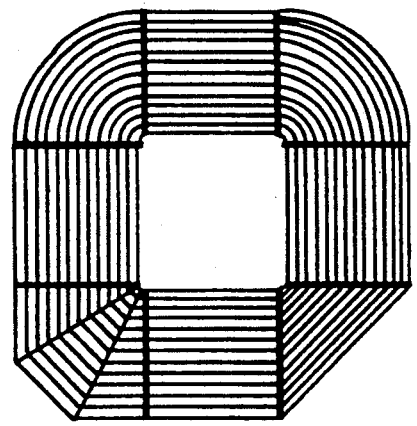

FIG. 12 shows a set of shelves which has the shape of a closed ring in top view.

Figure 13:
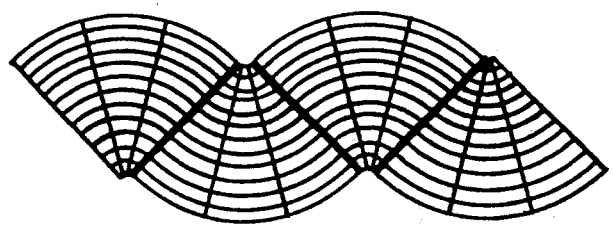

The set of shelves of FIG. 13 comprises exclusively circular sector-shaped horizontal elements.

FIGS. 14–16 illustrate three different applications of a sector-shaped horizontal element 4 which are not made of metal wire grating like the horizontal element in FIG. 2. FIG. 14 presents a horizontal element 4 comprising side bars $5^1$ and $5^2$ and a cross bar 11 therebetween. The ends of the side bars $5^1$ and $5^2$ are connected by an edge bar 200 having the shape of a quarter circle arc. Upon the frame formed by these components a metallic thin sheet 201 has been point welded. The horizontal element 4 can be attached as taught by the invention to a fixing element 6. The horizontal element may furthermore comprise radial bars 203 secured to the frame, which lend additional bracing to the sheet.

In FIG. 15 is depicted an application of the horizontal element 4 in which upon side bars $5^1, 5^2$ and a cross bar 11, and upon a trapezoidally shaped edge bar formed of straight sections, a plastic sheet 202 has been fixed with snap junctures.

Finally, in FIG. 16 is presented an application of the horizontal element 4 in which the frame is triangular and upon it has been disposed a glass plate 201, which is kept in place by its own weight, e.g. upon bracing flanges 204 and radial bars 203.

Naturally, rectangular horizontal elements may also be formed according to the same principles, applied in the case of the sector-shaped horizontal elements of FIGS. 14–16.

The invention is not exclusively confined to concern the embodiment examples presented in the foregoing: numerous modifications are feasible within the scope of the inventive idea defined by the claims.

I claim:

1. A set of shelves comprising:
   at least two vertical elements ($1^1$, $1^2$) having a generally rectangular shape, each vertical element comprising at least two vertical edge posts (2) and horizontal carrier bars (3) which connect the edge posts rigidly with each other, said vertical elements being disposed generally at an angle ($\alpha$) relative to each other;
   at least one horizontal element (4) including a first side bar ($5^1$) and a second side bar ($5^2$) disposed at said angle ($\alpha$) relative to each other; and
   a fixing element (6) for detachably connecting the horizontal element (4) to the vertical elements at a location where at least two carrier bars ($3^1$, $3^2$) on adjacent vertical elements are at the same vertical level, the fixing element (6) comprising first engagement means (7) for detachably affixing said fixing element (6) to at least said two carrier bars ($3^1$, $3^2$) and for holding said two vertical elements at said angle ($\alpha$) relative to each other, and second engagement means (8) for engaging said first and second side bars ($5^1$, $5^2$) and detachably affixing the horizontal element (4) to said fixing element (6).

2. The set of shelves according to claim 1, characterized in that the first engagement means (7) comprises at least two carrier bar channels ($9^1$, $9^2$) opening outwardly from said fixing element (6), the carrier bar channels having a longitudinal axes ($13^1$, $13^2$) parallel to respective carrier bar ($3^1$, $3^2$) and at said angle ($\alpha$) relative to each other so that each carrier bar channel is positioned to receive a respective carrier bar for affixing the same to the fixing element (6).

3. The set of shelves according to claim 1, characterized in that the second engagement means (8) comprises at least two upwardly open horizontal side bar channels ($10^1$, $10^2$) each having a longitudinal axis ($14^1$, $14^2$) extending parallel to a respective side bar ($5^1$, $5^2$) and arranged to receive a side bar for affixing the horizontal element (4) to the fixing element (6), the longitudinal axes of the side bar channels extending at said angle ($\alpha$) relative to each other.

4. The set of shelves according to claim 1, characterized in that the horizontal element (4) includes a cross bar (11) rigidly connecting the side bars ($5^1$) and ($5^2$) so that the side bars do not intersect, and the second engagement means (8) of the fixing element (6) includes a cross bar channel (12) having a longitudinal axis ($14^3$) parallel to the cross bar (11) so that the cross bar channel (12) is arranged to be detachably affixed to the cross bar (11).

5. The set of shelves according to claim 1, characterized in that the longitudinal axes ($13^1$, $13^2$) of the carrier bar channels ($9^1$, $9^2$) lie in a plane which is offset from the plane in which the longitudinal axes ($14^1$, $14^2$, $14^3$) of the side bar channels ($10^1$, $10^2$) and of the cross bar channel (12) lie.

6. The set of shelves according to claim 1, characterized in that the set of shelves comprises a plurality of vertical elements ($1^1$, $1^2$, $1^3$, $1^4$) which are fixed to each other with a plurality of generally similar fixing elements (6).

7. The set of shelves according to claim 6, characterized in that a plurality of adjacent fixing elements (6) have their first engagement means (7) in the form of a carrier bar channel ($9^1$, $9^2$) located in the same plane as the first engagement means of an adjacent fixing element, so that the adjacent carrier bar channels of two fixing elements are arranged to engage the same carrier bar.

8. The set of shelves according to claim 6 characterized in that first and second adjacent fixing elements are arranged so that the second engagement means (8) in the form of a side bar channel ($10^1$, $10^2$) of the first fixing element (6) is located in the same plane as the second engagement means of the second fixing element (6), whereby the adjacent side bar channels belonging to two fixing elements are arranged to engage the same side bar.

9. The set of shelves according to claim 1, characterized in that the fixing element (6) is formed from one material with the first and second engagement means (7,8) being integral formed in the fixing element.

10. The set of shelves according to claim 1, characterized in that the fixing element (6) is made of plastic.

11. The set of shelves according to claim 1, characterized in that the first engagement means (7) is a snap coupling.

12. The set of shelves according to claim 1 characterized in that the second engagement means (7) is a snap coupling.

13. The set of shelves according to claim 1, characterized in that the angle ($\alpha$) is a right angle.

14. The set of shelves according to claim 6, characterized in that the angle ($\alpha$) may vary between vertical elements ($1^1$, $1^2$, $1^3$, $1^4$).

* * * * *